US012617445B2

(12) United States Patent
Sakurada et al.

(10) Patent No.: US 12,617,445 B2
(45) Date of Patent: May 5, 2026

(54) SHOPPING CART

(71) Applicants: Toshiba Tec Kabushiki Kaisha, Tokyo (JP); ENAX, Inc., Tokyo (JP)

(72) Inventors: Katsuaki Sakurada, Yokohama Kanagawa (JP); Masahiro Yasuno, Yokohama Kanagawa (JP); Katsuya Takeda, Yokohama Kanagawa (JP); Hachirou Sawada, Yokohama Kanagawa (JP); Reiji Sugikami, Yokohama Kanagawa (JP); Tomonori Sugiyama, Yokohama Kanagawa (JP); Hiroki Takeda, Saitama Saitama (JP); Takahiro Okazaki, Bunkyo Tokyo (JP); Ryoichi Yamamoto, Bunkyo Tokyo (JP); Tomoyuki Kitada, Bunkyo Tokyo (JP)

(73) Assignees: Toshiba Tec Kabushiki Kaisha, Tokyo (JP); ENAX, Inc., Tokyo (JP)

( * ) Notice: Subject to any disclaimer, the term of this patent is extended or adjusted under 35 U.S.C. 154(b) by 197 days.

(21) Appl. No.: 18/465,107

(22) Filed: Sep. 11, 2023

(65) Prior Publication Data
US 2024/0083482 A1 Mar. 14, 2024

(30) Foreign Application Priority Data
Sep. 13, 2022 (JP) ................................. 2022-145102

(51) Int. Cl.
*B62B 3/14* (2006.01)
*B62B 5/00* (2006.01)

(52) U.S. Cl.
CPC .......... *B62B 3/1416* (2013.01); *B62B 3/1424* (2013.01); *B62B 5/0096* (2013.01)

(58) Field of Classification Search
CPC ... B62B 3/1416; B62B 3/1424; B62B 5/0096; B62B 3/1404; B62B 3/1412; B62B 3/14;
(Continued)

(56) References Cited

U.S. PATENT DOCUMENTS 4,725,822 A 2/1988 Hooley
5,488,202 A 1/1996 Baitz
(Continued)

FOREIGN PATENT DOCUMENTS

CN 206336317 U 7/2017
DE 102018132059 A1 6/2020
(Continued)

OTHER PUBLICATIONS

U.S. Appl. No. 18/447,250, filed Aug. 9, 2023.

*Primary Examiner* — James A Shriver, II
*Assistant Examiner* — Hilary L Johns
(74) *Attorney, Agent, or Firm* — Kim & Stewart LLP

(57) ABSTRACT

Provided is a shopping cart capable of simplifying equipment of a storage area of the shopping cart. A shopping cart allowed to be nested in a front-rear direction, including: a cart body; a battery configured to supply power to an electronic device attached to the cart body for displaying commodity information read by a reading device; a power receiving portion provided on a front side of the cart body and configured to be electrically connectable to an external power supply; and a power transmitting portion provided on a rear surface side of the power receiving portion and configured to supply power to a power receiving portion of another shopping cart nested in the shopping cart. Each of the power receiving portion and the power transmitting portion is provided with a magnet configured for holding a relative position.

9 Claims, 8 Drawing Sheets

(58) Field of Classification Search

CPC ..... B62B 3/1428; B62B 2205/30; B62B 3/02; B62B 3/1468; B62B 3/1476; B62B 3/18; B62B 5/00; B62B 5/0053; B62B 5/06; B62B 2202/61; B62B 2207/00; B62B 3/002; B62B 3/1408; B62B 5/0006

USPC ...................................................... 280/33.991

See application file for complete search history.

(56) References Cited

U.S. PATENT DOCUMENTS

| | | | |
|---|---|---|---|
| 5,814,968 A | 9/1998 | Lovegreen | |
| 6,997,382 B1 | 2/2006 | Bhri | |
| 7,660,747 B2 * | 2/2010 | Brice | G06Q 30/0266 |
| | | | 705/26.81 |
| 9,254,856 B2 * | 2/2016 | Oachs | B25H 3/00 |
| 10,086,859 B2 * | 10/2018 | Chen | B62B 3/1404 |
| 10,266,196 B1 | 4/2019 | Sinha | |
| 10,759,459 B2 * | 9/2020 | Kurata | B62B 3/1412 |
| 10,769,713 B1 | 9/2020 | Townsend | |
| 11,155,290 B2 * | 10/2021 | Yokoyama | B62B 5/0006 |
| 11,167,780 B2 * | 11/2021 | Yokoyama | G06Q 20/32 |
| 11,299,188 B2 * | 4/2022 | Yokoyama | B62B 5/0096 |
| 11,430,044 B1 * | 8/2022 | Maron | G06V 10/751 |
| 11,780,486 B2 * | 10/2023 | Ogishima | H02J 50/00 |
| | | | 280/33.991 |
| 12,536,519 B2 | 1/2026 | Gao | |
| 2006/0007191 A1 * | 1/2006 | Chi | B62B 3/1424 |
| | | | 345/184 |
| 2008/0088444 A1 | 4/2008 | Rosebush | |
| 2009/0228363 A1 | 9/2009 | Segev | |
| 2012/0296751 A1 | 11/2012 | Napper | |
| 2015/0206121 A1 | 7/2015 | Joseph | |
| 2015/0210306 A1 * | 7/2015 | Oachs | B62B 3/00 |
| | | | 280/79.11 |
| 2017/0158215 A1 | 6/2017 | Phillips | |
| 2017/0305450 A1 * | 10/2017 | Chen | B62B 3/182 |
| 2018/0260799 A1 | 9/2018 | Doerr | |
| 2018/0370554 A1 * | 12/2018 | Raza | B62B 3/1404 |
| 2019/0073656 A1 * | 3/2019 | Joseph | G06Q 20/40145 |
| 2019/0270470 A1 * | 9/2019 | Kurata | B62B 5/0096 |
| 2019/0272400 A1 | 9/2019 | Naito et al. | |
| 2020/0127505 A1 * | 4/2020 | Kato | B62B 3/1404 |
| 2020/0172140 A1 * | 6/2020 | Yokoyama | B62B 3/1412 |
| 2020/0254895 A1 | 8/2020 | Kim | |
| 2021/0001741 A1 * | 1/2021 | Miyoshi | G06K 7/10881 |
| 2021/0090052 A1 * | 3/2021 | Maita | G06Q 20/202 |
| 2021/0117950 A1 | 4/2021 | Bentsur | |
| 2021/0403065 A1 * | 12/2021 | Sa | B62B 5/0053 |
| 2022/0405729 A1 | 12/2022 | Soh | |
| 2023/0016155 A1 * | 1/2023 | Hiramatsu | G07G 1/0036 |
| 2023/0035629 A1 * | 2/2023 | Naito | G06K 7/12 |
| 2023/0070487 A1 * | 3/2023 | Ogishima | B62B 3/1404 |
| 2023/0147385 A1 | 5/2023 | Hagen | |
| 2024/0013185 A1 | 1/2024 | Gao | |
| 2024/0034381 A1 | 2/2024 | Gao | |
| 2024/0212024 A1 | 6/2024 | Becker | |
| 2025/0102348 A1 | 3/2025 | Tzuberi | |
| 2025/0140084 A1 | 5/2025 | Kawabe | |
| 2025/0232280 A1 | 7/2025 | Gyure | |
| 2025/0232360 A1 | 7/2025 | K.Rajappan | |

FOREIGN PATENT DOCUMENTS

| | | | |
|---|---|---|---|
| EP | 3517353 A1 | 7/2019 |
| JP | 2006-101577 A | 4/2006 |
| JP | 2019-153064 A | 9/2019 |
| JP | 2020-066310 A | 4/2020 |
| JP | 2022-032815 A | 2/2022 |
| WO | 0136248 A1 | 5/2001 |
| WO | 2018231184 A1 | 12/2018 |

* cited by examiner

SHOPPING CART

CROSS-REFERENCE TO RELATED APPLICATION

This application is based upon and claims the benefit of priority from Japanese Patent Application No. 2022-145102, filed Sep. 13, 2022, the entire contents of which are incorporated herein by reference.

FIELD

Embodiments relate to a shopping cart, for example, a shopping cart mainly used in a store such as a supermarket or a shopping mall.

BACKGROUND

Conventionally, in a store such as a supermarket or a shopping mall, payment is processed by a store clerk or a customer at a cash register provided in the store. Thus, for example, during busy hours, etc., customers waiting for payments are concentrated at the cash register, which not only makes the customers wait for a long time, but also places a heavy workload on the clerk processing the payments.

Therefore, a system has been proposed in which payment processing can be performed without going to the cash register by being equipped with electronic devices such as a reading device capable of reading commodity information and a display device capable of displaying payment information, etc. in a shopping cart, and a battery that supplies power to these electronic devices, and reading commodity information on the spot when a customer selects a commodity.

In the shopping cart used in this type of system, power is supplied from the battery to the electronic devices, and the battery needs to be charged. For example, while each shopping cart is provided with a power receiving device, a cart storage area in which a plurality of shopping carts is stored is provided with a plurality of power transmitting devices, and when shopping carts are stored in the cart storage area, the power receiving device of each shopping cart faces a power transmitting device in the cart storage area, so that the battery is supplied with power from the power transmitting device via the power receiving device.

However, in the shopping cart described above, each shopping cart is supplied with power from an individual power transmitting device. Thus, it is necessary to install a plurality of power transmitting devices in parallel on a side of the cart storage area, and there is a problem in that equipment of the cart storage area cannot be simplified.

The embodiments have been made by paying attention to such a problem, and an object of the embodiments is to provide a shopping cart capable of simplifying equipment of a storage area of the shopping cart.

DETAILED DESCRIPTION

Modes for carrying out a shopping cart will be described below on the basis of embodiments.

EMBODIMENTS

Figures 1A, 1B:
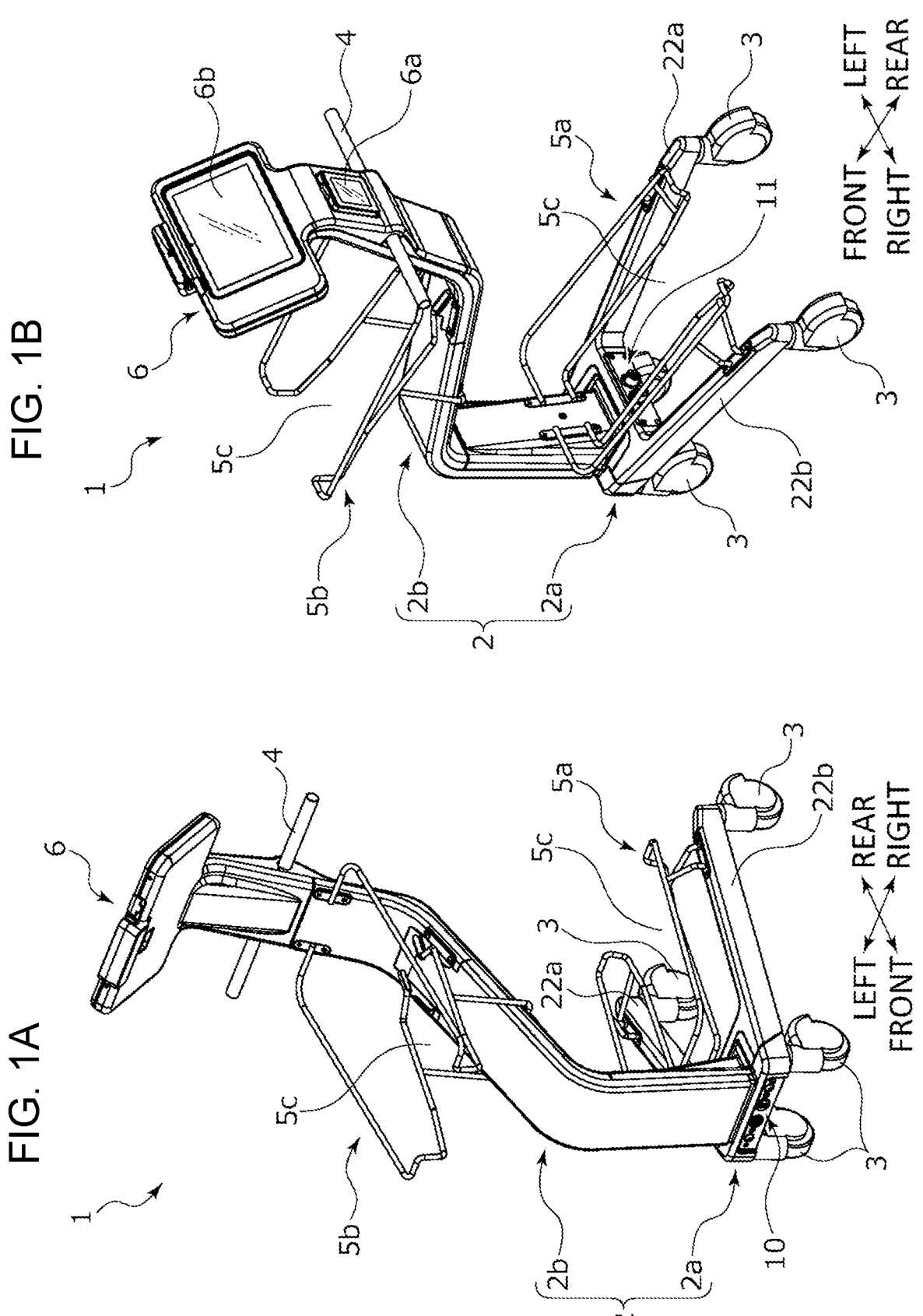
FIGS. 1A and 1B are perspective views illustrating a shopping cart according to an embodiment.
Figure 2:
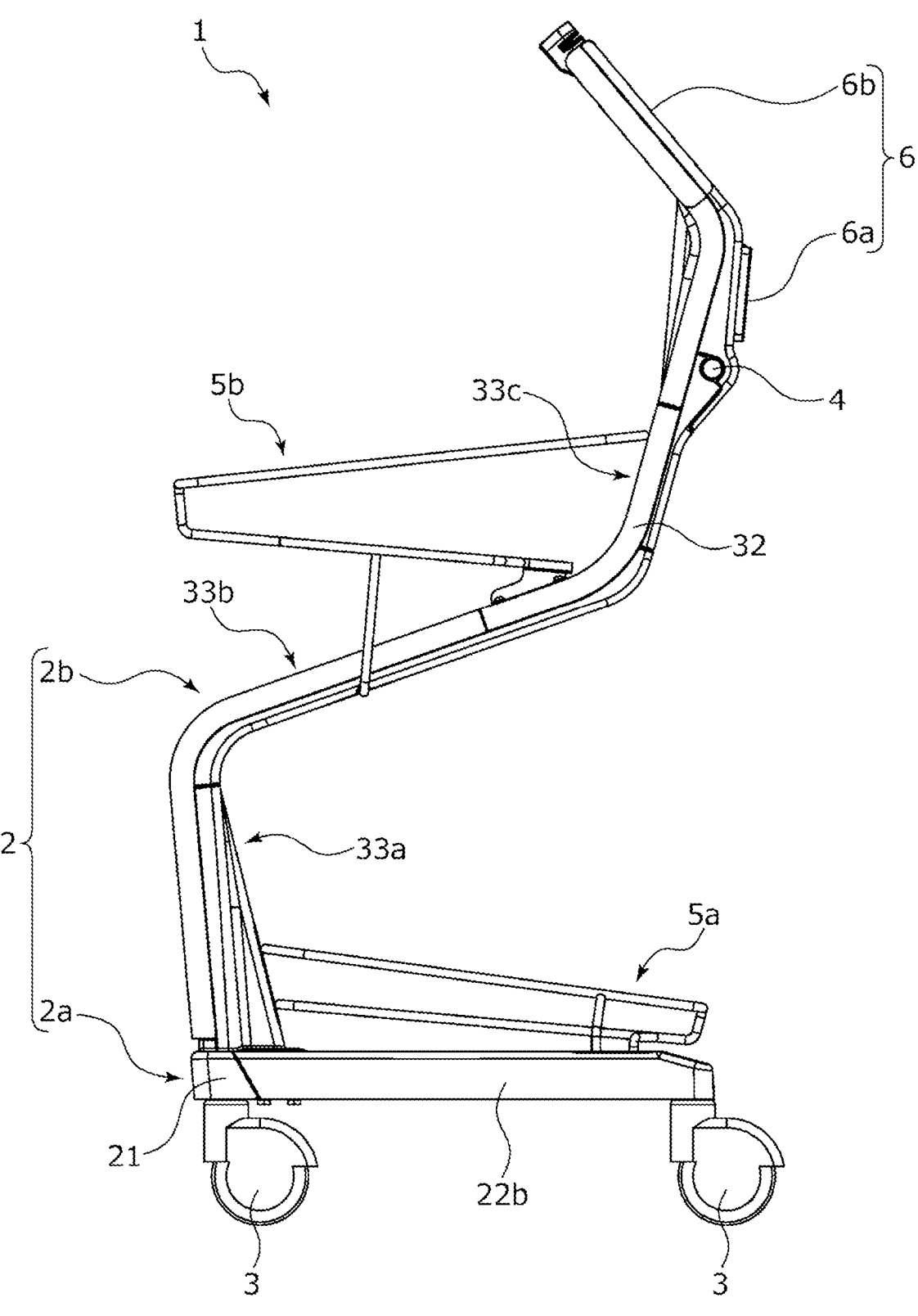
FIG. 2 is a right side view illustrating the shopping cart.
Figure 3:
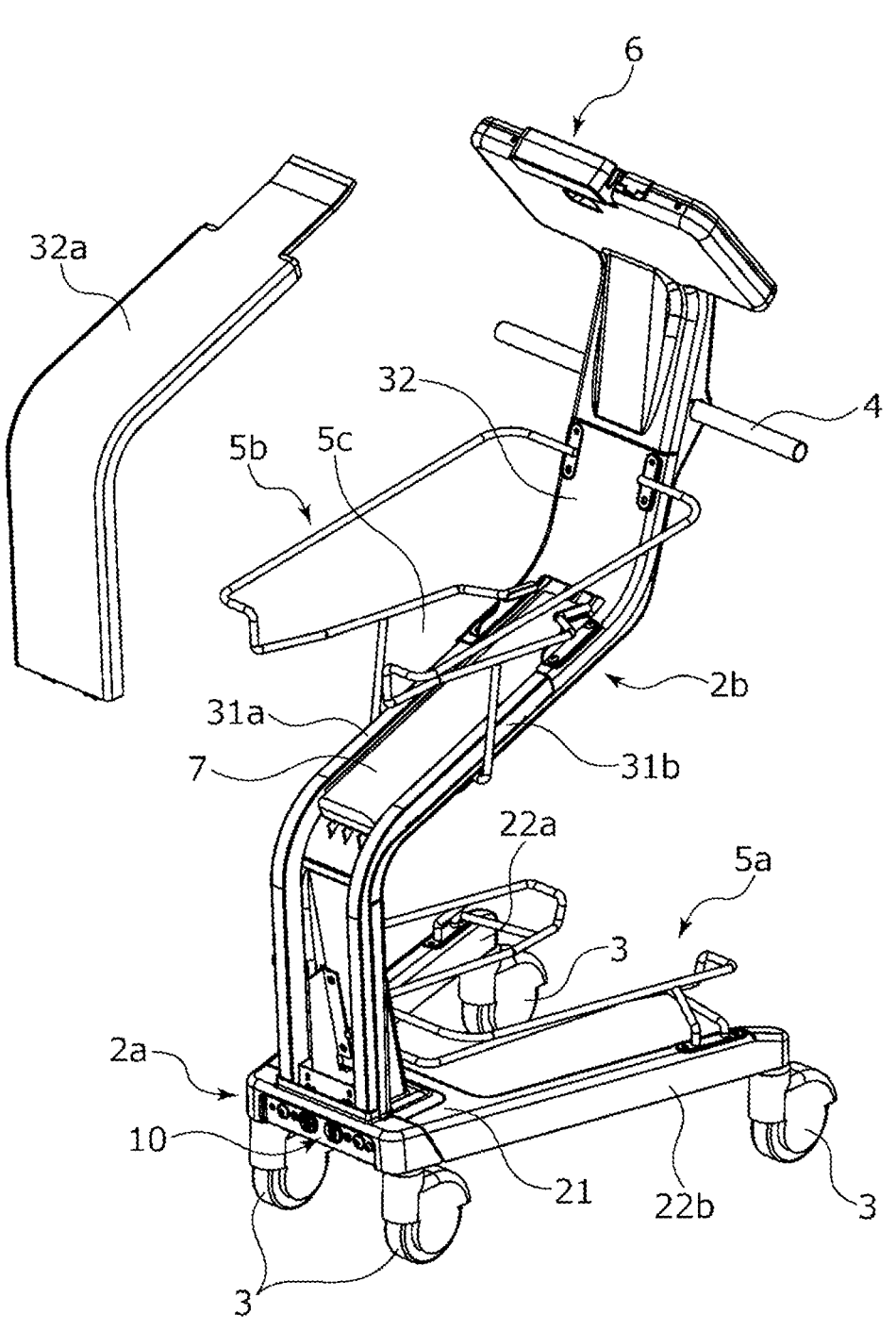
FIG. 3 is a perspective view illustrating a state in which an opening/closing portion of a cover is opened.

A shopping cart according to an embodiment will be described below with reference to FIGS. 1 to 8. Note that, in the following description, a diagonally lower left of FIG. 1A is set as a front of the shopping cart, and front, rear, right, and left directions (see the arrows of FIG. 1) when viewing the shopping cart from the front are used as the reference.

As illustrated in FIGS. 1 to 5, for example, the shopping cart 1 (hereinafter abbreviated as a cart) is a cart used by customers to a supermarket, a shopping mall, etc. The cart 1 mainly includes a cart body 2, a plurality of (for example, four) casters 3 provided on a lower part of the cart body 2, a handle 4 operated by a user, two upper and lower placing portions 5*a* and 5*b* on which baskets (not illustrated) capable of holding commodities can be placed, an electronic device 6 used for payment processing of commodities selected by the user, a battery 7 capable of supplying power to the electronic device 6, a power receiving portion 10 for receiving power, and a power transmitting portion 11 for transmitting power, and can be nested in a front-rear direction as described later.

The cart body 2 mainly includes a lower body part 2*a* having a substantially bifurcated shape in a plan view disposed along a floor surface, and a plate-shaped upper body part 2*b* erected at a front of the lower body part 2*a*.

Figure 5:
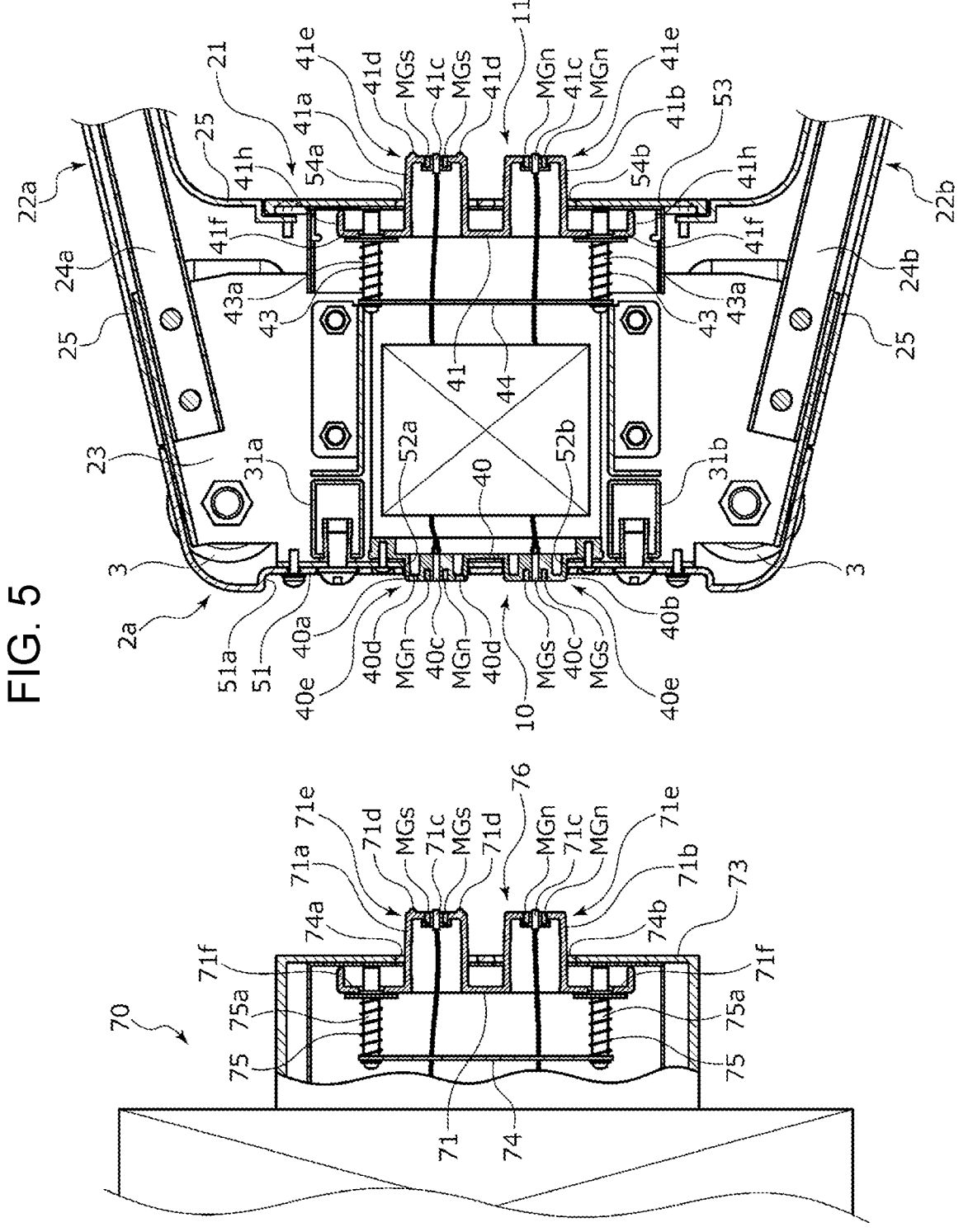
FIG. 5 is a partially broken plan view illustrating an external power supply device and a front portion of the lower body of the cart.

As illustrated in FIG. 5, the lower body part 2*a* has a base member 23 made of a metal plate, frame members 24*a* and 24*b* made of metal square tubes extending rearward from right and left sides of the base member 23, and a cover member 25 made of synthetic resin provided to cover the outside of the base member 23 and the frame members 24*a* and 24*b*, and includes a base 21 having a substantially trapezoidal shape in a plan view, and side frames 22*a* and 22*b* (cart guide frames) extending rearward from right and left sides of the base 21. The casters 3 are attached to the right and left sides of the base member 23 and lower parts of rear ends of the frame members 24*a* and 24*b*, and can move on the floor surface.

As illustrated in FIGS. 1 to 5, the power receiving portion 10 is provided on a front surface side of the base 21, and the power transmitting portion 11 is provided on a rear surface side thereof. Note that details of the power receiving portion 10 and the power transmitting portion 11 will be described below. The side frames 22a and 22b are spaced apart from each other to the right and left, and are arranged in a substantially V-shape in a plan view such that a distance therebetween gradually increases toward the rear side.

The upper body part 2b is configured in a plate shape having two frame members 31a and 31b (support frames) erected and separated from each other on right and left sides of an upper surface of the base member 23, a cylindrical cover member 32 provided to cover the outside of the frame members 31a and 31b, and has a first frame 33a extending forward and upward from an upper surface of the base 21, a second frame 33b extending rearward and upward from an upper end of the first frame 33a, and a third frame 33c extending rearward and upward from an upper end of the second frame 33b.

The right and left frame members 31a and 31b are made of metal square tubes, and are coupled at a plurality of upper and lower positions by coupling pipes (not illustrated) directed in a right-left direction. In addition, the cover member 32 is made of a synthetic resin material, a part thereof corresponding to the first frame 33a and the second frame 33b in a front surface portion serves as a removable opening/closing portion 32a, and the insides of the first frame 33a and the second frame 33b are opened by removing the opening/closing portion 32a.

Further, the battery 7 is stored in a space formed between the right and left frame members 31a and 31b in the second frame 33b. In this way, the battery 7 is compactly stored in the space formed between the right and left frame members 31a and 31b in the upper body part 2b included in the cart body 2, and is protected by the right and left frame members 31a and 31b having high strength. Further, by opening the opening/closing portion 32a, replacement and maintenance work of the battery 7 can be easily performed.

Further, the placing portion 5a arranged on the rear side of the first frame 33a and the placing portion 5b arranged on the front side of the third frame 33c are each formed into a box shape having a top opened by bending a linear member, and are attached to the frame members 31a and 31b using screw members. Specifically, the placing portion 5a is arranged behind the first frame 33a and below the second frame 33b, and the placing portion 5b is arranged in front of the first frame 33a and above the second frame 33b.

Further, a receiving portion 5c capable of receiving the upper body part 2b of another cart 1 extends in the front-rear direction at a central position of each of the placing portions 5a and 5b in the right-left direction. Note that the receiving portion 5c of the upper placing portion 5b is formed with a lateral width dimension that allows the opening/closing portion 32a to be inserted thereto, and thus does not in contact therewith when the opening/closing portion 32a is opened or closed.

The placing portion 5a is provided to be inclined downward toward the rear, the second frame 33b is provided to be inclined upward toward the rear, and a vertical distance between the second frame 33b and the lower body part 2a widens toward the rear, so that a customer easily puts a commodity from the rear of the cart 1 into a basket (not illustrated) placed on the placing portion 5a.

In the present embodiment, for example, a reading device 6a such as a reader for reading information of a commodity selected by the user of the cart 1 and an information terminal 6b that displays commodity information read by the reading device 6a and enables various operations are provided as the electronic device 6. However, other devices other than the above-mentioned devices used for registration processing, payment processing, or registration processing and payment processing of the commodity selected by the customer may be provided.

As illustrated in FIGS. 4 and 5, power receiving-side connection portions 40a and 40b are provided on right and left sides of a front surface of the base 21, and power transmitting-side connection portions 41a and 41b are provided on right and left sides of a rear surface thereof.

Specifically, as illustrated in FIG. 5, a power receiving-side case 40 having forwardly protruding cylindrical protrusions 40e and 40e formed on right and left sides thereof is arranged inside a front wall 51 of the base 21. The right and left sides of the power receiving-side case 40 laterally protrude from the protrusions 40e and 40e, and are fixed to the front wall 51 by screws at protrusion positions. The power receiving-side connection portions 40a and 40b include the protrusions 40e and 40e formed on the power receiving-side case 40, and are provided to protrude slightly forward from circular connection openings 52a and 52b formed in a recess 51a on the front wall 51.

Figure 4A:
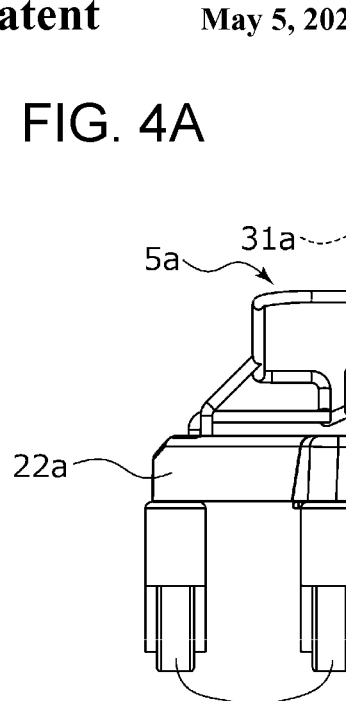
FIG. 4A is a front view illustrating a lower part of a cart body.

In addition, as illustrated in FIG. 4A, a connection terminal 40c, which is connected to a power transmission wire and has a plurality of round holes vertically arranged in a row, is provided on a front surface of each of the power receiving-side connection portions 40a and 40b. In addition, N-pole magnets MGn are provided on right and left sides of the connection terminal 40c on the front surface of the power receiving-side connection portion 40a, and S-pole magnets MGs are provided on right and left sides of the connection terminal 40c of the power receiving-side connection portion 40b. In addition, recesses 40d each having a circular shape in a front view are formed on both right and left sides of the magnets MGn on the front surface of the power receiving-side connection portion 40a on the left side. In this way, the power receiving portion 10 mainly includes the connection terminals 40c and the power receiving-side case 40.

Meanwhile, as illustrated in FIG. 5, a power transmitting-side case 41 having cylindrical protrusions 41e and 41e protruding rearward and formed on right and left sides thereof is arranged to be movable in the front-rear direction inside a rear wall 53 of the base 21. The right and left sides of the power transmitting-side case 41 laterally protrude from the protrusions 41e and 41e, and protruding ends 41f and 41f are inserted into guide shafts 43a and 43a fixed to a fixing plate 44 and the rear wall 53 at both ends and directed in the front-rear direction. In addition, compression springs 43 and 43 are fit between the ends 41f and 41f and the fixing plate 44 around the guide shafts 43a and 43a to bias the ends 41f and 41f on the right and left sides of the power transmitting-side case 41 rearward.

The power transmitting-side connection portions 41a and 41b include the protrusions 41e and 41e formed on the power transmitting-side case 41, and are provided to protrude rearward from circular connection openings 54a and 54b formed in the rear wall 53. In this way, the power transmitting portion 11 is biased by the compression springs 43 and 43 and is movable between a retraction position and a protrusion position behind the retraction position. Note that a protrusion dimension at the protrusion position of each of the power transmitting-side connection portions 41a and 41b, specifically, a protrusion dimension from the rear wall 53 is presumed to be longer than a protrusion dimension of each of the power receiving-side connection portions 40a and 40b, specifically, a protrusion dimension from the front wall 51. In addition, the front wall 51 and the rear wall 53 of the base 21 include the cover member 25.

In addition, the power transmitting-side connection portions 41a and 41b are inserted into the right and left connection openings 54a and 54b and guided to move in the front-rear direction, so that the power transmitting portion 11 can smoothly move in the front-rear direction. In addition, since both the connection openings 54a and 54b and the power transmitting-side connection portions 41a and 41b are formed in circular shapes, the power transmitting portion 11 moves more smoothly in the front-rear direction.

Further, the right and left protruding ends 41f and 41f have contact pieces 41h extending forward along the power transmitting-side connection portions 41a and 41b orthogonally, respectively. Since these contact pieces 41h are separated from each other by a long distance to the right and left, the power transmitting portion 11 is stable at the protrusion position. In addition, since there is no surface contact with the rear wall 53 (cover member 25), the power transmitting portion 11 can easily move smoothly from the protrusion position to the retraction position.

Furthermore, although not illustrated in particular detail, the contact pieces 41h are formed in a rectangular tubular shape not only on the right and left sides of the power transmitting-side case 41, but also along upper, lower, right, and left sides of the power transmitting-side case 41, thereby increasing the strength of the power transmitting-side case 41, and thus damage, etc. due to impact is prevented.

Figure 4B:
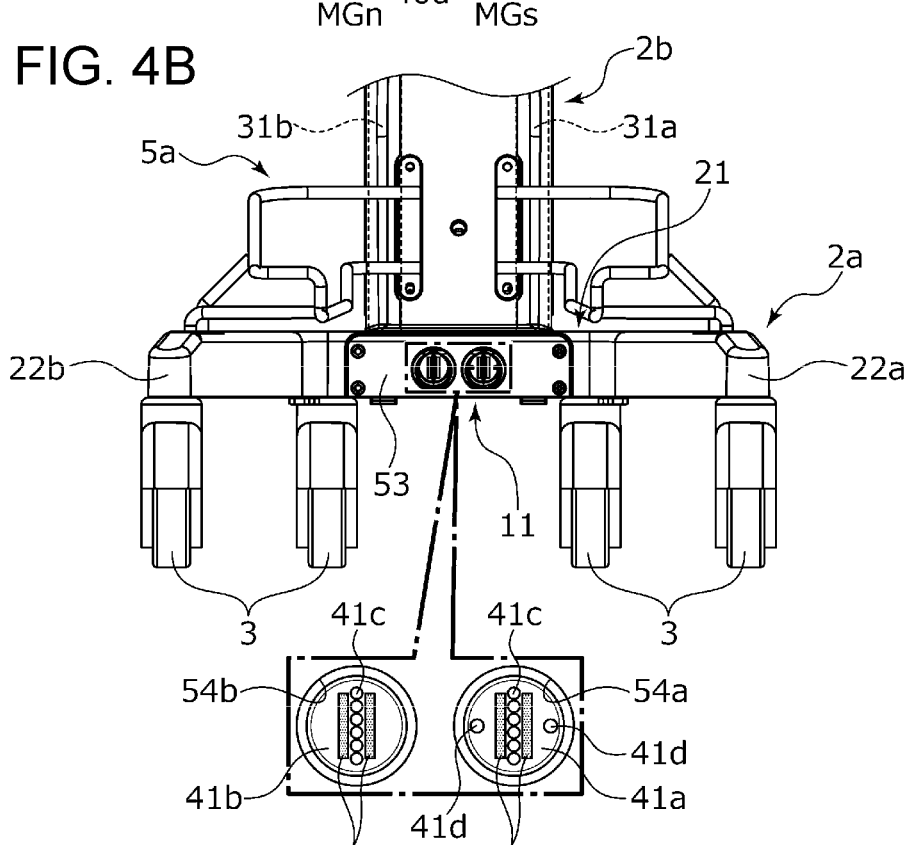
FIG. 4B is a rear view illustrating the lower part of the cart body.

As illustrated in FIG. 4B, a connection terminal 41c connected to the power transmission wire and having a plurality of cylindrical protrusions arranged vertically in a row is provided on the rear surface of each of the power transmitting-side connection portions 41a and 41b. In addition, S-pole magnets MGs are provided on right and left sides of the connection terminal 41c on the rear surface of the power transmitting-side connection portion 41a, and N-pole magnets MGn are provided on right and left sides of the connection terminal 41c of the power transmitting-side connection portion 41b. In addition, a hemispherical protrusion 41d that can be accommodated in the recess 40d is formed on each of both right and left sides of the magnets MGs on the rear surface of the power transmitting-side connection portion 41a on the left side. In this way, the power transmitting portion 11 includes the connection terminal 41c and the power transmitting-side case 41.

In addition, the power transmitting-side connection portions 41a and 41b are provided directly behind the power receiving-side connection portions 40a and 40b. Specifically, the power receiving-side connection portions 40a and 40b and the power transmitting-side connection portions 41a and 41b are approximately at the same height from the floor surface, and are arranged approximately at central positions of the cart body 2 in the right-left direction. Further, a right-left separation distance between the power transmitting-side connection portions 41a and 41b is substantially the same as a right-left separation distance between the power receiving-side connection portions 40a and 40b.

The front wall 51 includes a cushioning material made of a soft synthetic resin material or a hard rubber material, so that impact caused by contact with another cart 1 is cushioned. Note that, in the present embodiment, the front wall 51 is made of the cushioning material. However, it is sufficient that at least one of the front wall 51 and the rear wall 53 is made of the cushioning material.

In addition, the electronic device 6 is electrically connected to the battery 7 and supplied with power from the battery 7. In addition, the connection terminal 40c of each of the power receiving-side connection portions 40a and 40b included in the power receiving portion 10, the connection terminal 41c of each of the power transmitting-side connection portions 41a and 41b included in the power transmitting portion 11, and the battery 7 are electrically connected by an electric circuit (not illustrated), and power supplied to the power receiving portion 10 can be supplied to the battery 7 and the power transmitting portion 11. Then, for example, depending on the situation such as the remaining amount of the battery 7, the battery 7 can be charged with power supplied to the power receiving portion 10, or power can be supplied (transmitted) to the power receiving portion 10 of another cart 1 via the power transmitting portion 11.

Although not particularly illustrated in detail, a wire that electrically connects the battery 7, the electronic device 6, the power receiving portion 10, and the power transmitting portion 11 is stored along the frame members 31a and 31b in a space covered by the cover member 32. Note that a wire insertion hole (not illustrated) is formed in an upper wall separating the base 21 and the first frame 33a from each other, and wiring from the power receiving portion 10 and the power transmitting portion 11 to the first frame 33a can be performed.

Figure 6:
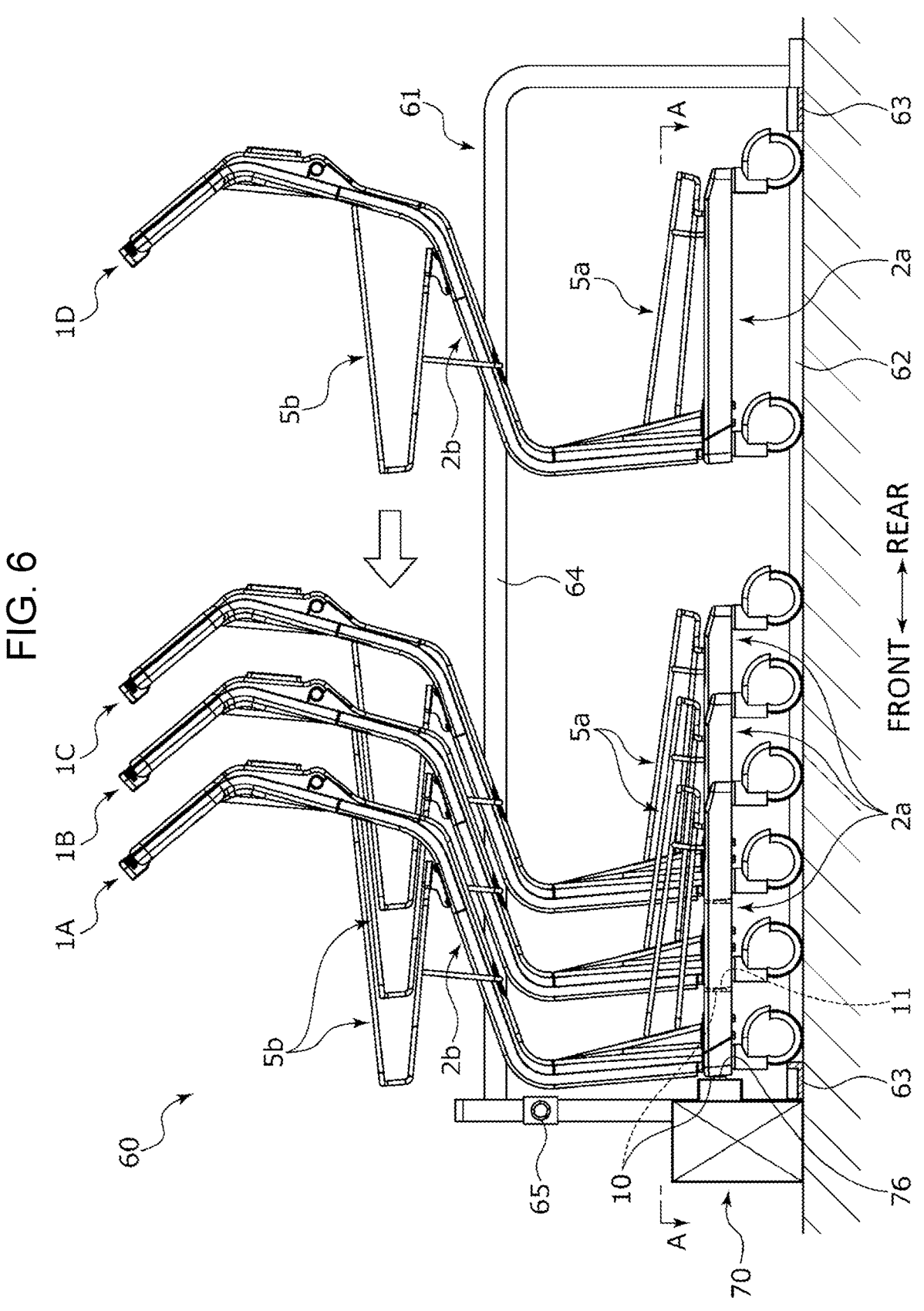
FIG. 6 is a right side view illustrating a state in which a plurality of shopping carts is stored in a cart storage area.
Figure 7:
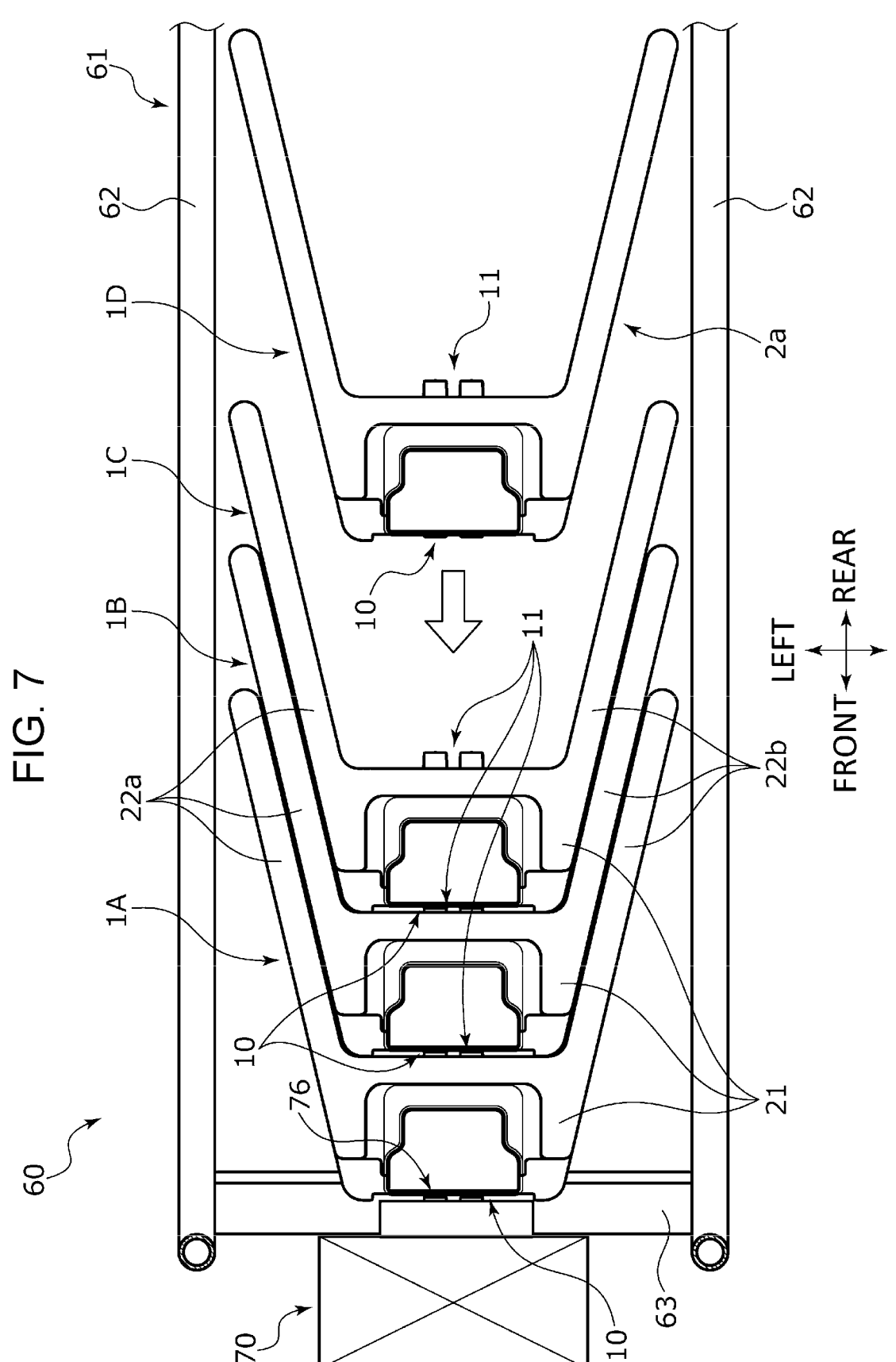
FIG. 7 is a cross-sectional view taken along the line A-A of FIG. 6.

As illustrated in FIGS. 6 and 7, for example, a plurality of carts 1 configured in this way can be stored in a cart storage area 60 installed at a predetermined position in the store. Note that directions indicated by arrows of FIGS. 6 and 7 are described as front, rear, right, and left sides of the cart storage area.

As illustrated in FIGS. 6 and 7, the cart storage area 60 includes a cart gate 61 that guides and stores the cart 1 in the front-rear direction, and an external power supply device 70 that can supply (transmit) power to the plurality of carts 1 stored in the cart gate 61.

The cart gate 61 is configured in a roughly U-shape in a plan view to surround the front side, the right side, and the left side of the cart storage area 60 except for the rear side by right and left fixed plates 62 and 62 fixed to both right and left sides of the floor surface of the cart storage area 60 and extending in the front-rear direction, coupling plates 63 and 63 directed in the right-left direction to couple the right and left fixed plates 62 and 62 to each other at front and rear positions of the cart gate 61, right and left horizontal pipes 64 extending back and forth and supported by the right and left fixed plates 62 and 62, and a front pipe 65 coupling the right and left horizontal pipes 64, and can guide and store the cart 1 entering from the rear side in a straight line toward the front side.

As illustrated in FIG. 5, the external power supply device 70 is provided with power transmitting-side connection portions 71a and 71b on the right and left sides of the rear surface side. On the inside of the rear wall 73 in the base 21, a power transmitting-side case 71 having cylindrical protrusions 71e and 71e protruding rearward and formed on the right and left sides thereof is arranged to be movable in the front-rear direction. The right and left sides of the power transmitting-side case 71 laterally protrude from the protrusions 71e and 71e, and protruding ends 71f and 71f are inserted into guide shafts 75a and 75a fixed to a fixing plate 74 and the rear wall 73 at both ends and directed in the front-rear direction. In addition, compression springs 75 and 75 are fit between the ends 71f and 71f and the fixing plate 74 around the guide shafts 75a and 75a to bias the ends 71f and 71f on the right and left sides of the power transmitting-side case 71 rearward.

The power transmitting-side connection portions 71a and 71b include the protrusions 71e and 71e formed on the power transmitting-side case 71, and are provided to protrude rearward from circular connection openings 74a and 74*b* formed in the rear wall 73. In this way, a power transmitting portion 76 for external power supply is biased by the compression springs 75 and 75 and is movable between a retraction position and a protrusion position behind the retraction position.

A connection terminal 71*c* connected to the power transmission wire and having a plurality of cylindrical protrusions arranged vertically in a row is provided on the rear surface of each of the power transmitting-side connection portions 71*a* and 71*b*. In addition, S-pole magnets MGs are provided on right and left sides on the rear surface of the connection terminal 71*c* of the power transmitting-side connection portion 71*a*, and N-pole magnets MGn are provided on right and left sides of the connection terminal 71*c* of the power transmitting-side connection portion 71*b*. In addition, a hemispherical protrusion 71*d* that can be accommodated in the recess 40*d* is formed on each of right and left sides of the magnets MGs on the rear surface of the power transmitting-side connection portion 71*a* on the left side. In this way, the power transmitting portion 76 for external power supply includes the connection terminal 71*c* and the power transmitting-side case 71. In addition, height positions of the power transmitting-side connection portions 71*a* and 71*b* from the floor surface are approximately the same as height positions of the power receiving-side connection portions 40*a* and 40*b* and the power transmitting-side connection portions 41*a* and 41*b* from the floor surface.

Next, an operation example of each part when the cart 1 is stored in the cart storage area 60 will be described with reference to FIGS. 6 to 8. Note that, in the following description, for convenience of description, the order in which the carts are stored in the cart storage area 60 will be described using alphabetical reference numerals such as carts 1A, 1B, 1C, and 1D.

Figures 8A, 8B, 8C:
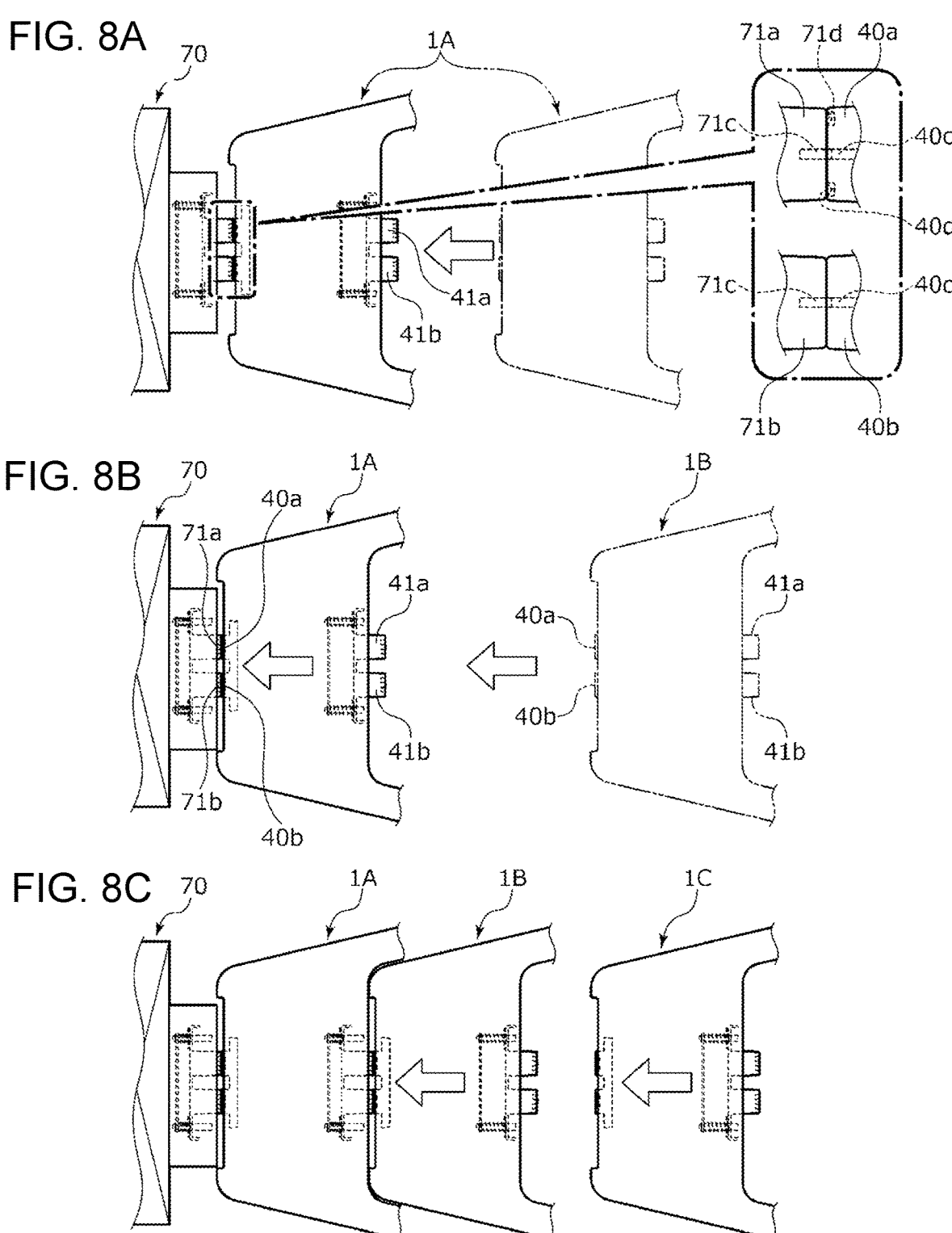
FIG. 8A is a schematic view illustrating a state in which a power transmitting portion of the external power supply device and a power receiving portion of a cart are in contact.
FIG. 8B is a schematic view illustrating a state in which the power transmitting portion of the external power supply device moves to a retraction position.
FIG. 8C is a schematic view illustrating a state in which the power transmitting portion of the external power supply device, the power receiving portion of the cart, and a power transmitting portion and a power receiving portion of a following cart are in contact.

As illustrated in FIGS. 6 and 7, when the foremost cart 1A stored first in the cart storage area 60 is positioned at a foremost storage position in the cart storage area 60, the front surfaces of the power receiving-side connection portions 40*a* and 40*b* of the cart 1A contact the rear surfaces of the power transmitting-side connection portions 71*a* and 71*b* located at protrusion positions in the external power supply device 70, so that the connection terminal 71*c* of each of the power transmitting-side connection portions 71*a* and 71*b* of the external power supply device 70 is inserted into the connection terminal 40*c* of each of the power receiving-side connection portions 40*a* and 40*b* of the cart 1A, and the connection terminal 71*c* is electrically connected to the connection terminal 40*c* by contacting the connection terminal 40*c* (see FIG. 8A).

Note that, when the power receiving-side connection portions 40*a* and 40*b* approach the power transmitting-side connection portions 71*a* and 71*b*, the N-pole magnets MGn of the power receiving-side connection portion 40*a* and the S-pole magnets MGs of the power transmitting-side connection portion 71*a* are attracted by magnetic force, and the S-pole magnets MGs of the power receiving-side connection portion 40*b* and the N-pole magnets MGn of the power transmitting-side connection portion 71*b* are attracted by magnetic force, so that the magnetic force of the magnets MGn and MGs induces the power receiving-side connection portions 40*a* and 40*b* to the power transmitting-side connection portions 71*a* and 71*b*, the connection terminals 40*c* and 71*c* are in a connected state, and then the connected state becomes difficult to be released. In addition, by accommodating the protrusion 71*d* in the recess 40*d*, the positions of the connection terminals 40*c* and 71*c* are induced and guided so that the connection terminals 40*c* and 71*c* are connected to each other.

Next, when the cart 1A moves further forward, the power transmitting-side connection portions 71*a* and 71*b* are pushed toward the retraction positions against biasing force of the compression springs 75 and 75 while maintaining the connected state of the connection terminals 40*c* and 71*c*. Then, when the cart 1A moves to a foremost storage position, and the front casters 3 of the cart 1A contact the front coupling plate 63, so that forward movement is restricted, the power transmitting-side connection portions 71*a* and 71*b* are located at the retraction positions (see FIG. 8B). That is, in the present embodiment, the connection terminals 40*c* and 71*c* are in a connected state at positions immediately before the cart 1A is stored in the foremost storage position, and the cart 1A moves to the foremost storage position while the connected state is maintained, so that the power transmitting-side connection portions 71*a* and 71*b* move from the protrusion positions to the retraction positions.

In this way, when the connection terminals 40*c* and 71*c* are in a connected state, power can be supplied from the power transmitting-side connection portions 71*a* and 71*b* to the power receiving-side connection portions 40*a* and 40*b*. In addition, power received by the power receiving-side connection portions 40*a* and 40*b* is supplied to the battery 7 via an electric circuit (not illustrated). Therefore, when the cart 1A is stored at the foremost storage position in the cart storage area 60, the connection terminals 40*c* and 71*c* of the power transmitting-side connection portions 71*a* and 71*b* and the power receiving-side connection portions 40*a* and 40*b* are in a connected state, and the battery 7 of the cart 1A is charged with power supplied from the external power supply device 70. In addition, power supplied from the external power supply device 70 can be supplied not only to the battery 7 of the cart 1A but also to the power transmitting-side connection portions 41*a* and 41*b*.

As illustrated in FIGS. 6 and 7, the plurality of carts 1A, 1B, 1C, 1D, . . . is configured to be allowed to be nested, that is, stacked in a row in the front-rear direction. For example, when another cart 1B is stacked and stored on the rear side of one cart 1A, a front portion of the lower body part 2*a* of the cart 1B on the rear side is fit to a space, which has a substantially concave shape in a plan view and whose rear side is open, formed by the base 21 and the right and left side frames 22*a* and 22*b* in the lower body part 2*a* of the cart 1A on the front side, and the upper body part 2*b* of the cart 1B on the rear side approaches the rear side of the upper body part 2*b* of the cart 1A on the front side, so that the cart 1B is stored in a row to stack the cart 1A in the front-rear direction.

In addition, when outer surfaces of the base 21 and the side frames 22*a* and 22*b* in the lower body part 2*a* of the cart 1B on the rear side contact inner surfaces of the base 21 and the side frames 22*a* and 22*b* of the cart 1A on the front side, movement of the cart 1B on the rear side in forward and right-left directions is restricted, another cart 1 is stored on a rear side of one cart 1 in a row.

Note that, the present embodiment illustrates a mode in which the outer surfaces of the base 21 and the side frames 22*a* and 22*b* in the lower body part 2*a* of the cart 1B on the rear side contact the inner surfaces of the base 21 and the side frames 22*a* and 22*b* of the cart 1A on the front side, so that movement of the cart 1B on the rear side in the forward and right-left directions is restricted. However, the embodiment is not limited thereto, and movement of the cart 1B on the rear side in the forward and right-left directions may be restricted by the outer surface of one of the base 21 and the side frames 22a and 22b of the cart 1B on the rear side contacting the inner surface of one of the base 21 and the side frames 22a and 22b of the cart 1A on the front side. In addition, at least forward movement of the cart 1B on the rear side may be restricted by the upper body parts 2b contacting each other.

As illustrated in FIGS. 6 and 7, when the following cart 1B is guided forward by the cart gate 61 and positioned at a storage position on the rear side of the foremost cart 1A while the cart 1A is stored at the foremost storage position of the cart storage area 60, by the front surfaces of the power receiving-side connection portions 40a and 40b of the cart 1B contacting the rear surfaces of the power transmitting-side connection portions 41a and 41b located at protrusion positions in the cart 1A, the connection terminal 41c of each of the power transmitting-side connection portions 41a and 41b of the foremost cart 1A is inserted into the connection terminal 40c of each of the power receiving-side connection portions 40a and 40b of the following cart 1B and electrically connected thereto by contacting the connection terminal 40c (see FIG. 8C).

Note that, when the power receiving-side connection portions 40a and 40b of the following cart 1B approach the power transmitting-side connection portions 41a and 41b of the foremost cart 1A, the N-pole magnets MGn of the power receiving-side connection portion 40a and the S-pole magnets MGs of the power transmitting-side connection portion 41a are attracted by magnetic force, and the S-pole magnets MGs of the power receiving-side connection portion 40b and the N-pole magnets MGn of the power transmitting-side connection portion 41b are attracted by magnetic force, so that the magnetic force of the magnets MGn and MGs induces the power receiving-side connection portions 40a and 40b to the power transmitting-side connection portions 41a and 41b, the connection terminals 40c and 41c are in a connected state, and then the connected state becomes difficult to be released. In addition, by accommodating the protrusion 41d in the recess 40d, the positions of the connection terminals 40c and 41c are induced and guided so that the connection terminals 40c and 41c are connected to each other.

Next, when the cart 1B moves further forward, the power transmitting-side connection portions 41a and 41b are pushed toward the retraction positions against biasing force of the right and left compression springs 43 and 43 while maintaining the connected state of the connection terminals 40c and 41c. Then, when movement of the cart 1B in the forward and right-left directions is restricted at a storage position on the rear side of the cart 1A, the power transmitting-side connection portions 41a and 41b are located at retraction positions (see FIG. 8C). That is, in the present embodiment, the connection terminals 40c and 41c are in a connected state at positions immediately before the cart 1B is stored at the storage position on the rear side of the cart 1A, and the cart 1B moves to the storage position while the connected state is maintained, so that the power transmitting-side connection portions 41a and 41b move from the protrusion positions to the retraction positions.

In this way, when the connection terminals 40c and 41c of the cart 1A supplied with power from the external power supply device 70 and the following cart 1 are in a connected state, power can be supplied from the power transmitting-side connection portions 41a and 41b of the foremost cart 1A to the power receiving-side connection portions 40a and 40b of the cart 1B. In addition, power received by the power receiving-side connection portions 40a and 40b of the cart 1B is supplied to the battery 7 via an electric circuit (not illustrated). Therefore, by storing the following cart 1B so as to be stacked on the rear side of the cart 1A stored in the cart storage area 60, the connection terminals 40c and 41c of the power transmitting-side connection portions 41a and 41b of the cart 1A and the power receiving-side connection portions 40a and 40b of the cart 1B are in a connected state, and the battery 7 of the following cart 1B is charged with power supplied from the external power supply device 70 via the power transmitting-side connection portions 41a and 41b of the cart 1A.

Furthermore, when power supplied from the external power supply device 70 via the power transmitting-side connection portions 41a and 41b of the cart 1A is supplied to the power transmitting-side connection portions 41a and 41b of the cart 1B, power is supplied from the power transmitting-side connection portions 41a and 41b of the cart 1B to the power receiving-side connection portions 40a and 40b of each of the following carts 1C and 1D, and thus power is supplied to the battery 7 and the power transmitting-side connection portions 41a and 41b of each of the carts 1C and 1D.

In this way, when the plurality of carts 1A, 1B, 1C, 1D, . . . is stored in the cart storage area 60, the foremost cart 1A is electrically connected to the external power supply device 70, and thus power is supplied to the cart 1A. Further, when the following carts 1B, 1C, 1D, . . . are sequentially stacked and stored on the foremost cart 1A, adjacent front and rear carts 1A and 1B, carts 1B and 1C, carts 1C and 1D . . . are electrically connected to each other, and power supplied from the external power supply device 70 is supplied to the cart 1 on the rear side via the cart 1 on the front side.

As described above, in the cart 1 according to the embodiment, the cart body 2, which can be nested in the front-rear direction, is equipped with the battery 7 that supplies power to the electronic device 6 used for commodity registration processing, payment processing, or registration processing and payment processing, the power receiving-side connection portions 40a and 40b electrically connectable to the power transmitting-side connection portions 71a and 71b of the external power supply device 70 are provided on the front surface side, and the power transmitting-side connection portions 41a and 41b for supplying power to the power receiving-side connection portions 40a and 40b of the following cart 1 nested in this cart 1 are provided on the rear surface side of the power receiving-side connection portions 40a and 40b. In this way, by sequentially storing the following carts 1B, 1C, 1D, . . . on the foremost cart 1A electrically connected to the external power supply device 70 of the cart storage area 60, the battery 7 mounted on each of the plurality of carts 1A, 1B, 1C, 1D, . . . can be charged using one power supply, and thus a power supply for each cart 1 becomes unnecessary, and equipment of the cart storage area 60 can be simplified.

In addition, the magnets MGn and MGs for determining relative positions between carts are provided near the connection terminals 40c in the power receiving-side connection portions 40a and 40b and near the connection terminals 40c in the power transmitting-side connection portions 41a and 41b, and relative positions of the power receiving-side connection portions 40a and 40b and the power transmitting-side connection portions 41a and 41b can be maintained by the magnets MGn and MGs, so that electrical connection between the connection terminals 40c and 41c of the power receiving-side connection portions 40a and 40b and the power transmitting-side connection portions 41a and 41b can be prevented from being easily released by receiving external force in a nesting state.

In addition, the power transmitting-side connection portions 41*a* and 41*b* are provided to be movable in the front-rear direction between the retraction position and the protrusion position, and are biased toward the protrusion position side by the right and left compression springs 43 and 43 serving as right and left biasing members constituting a biasing device. More specifically, in the cart 1 of the present embodiment, since the power transmitting-side connection portions 41*a* and 41*b* and the power receiving-side connection portions 40*a* and 40*a* are provided on the front side of the lower body part 2*a*, and the side frames 22*a* and 22*b* extending rearward from the power transmitting-side connection portions 41*a* and 41*b* are arranged on the right and left sides of the power transmitting-side connection portions 41*a* and 41*b* protruding rearward, the power transmitting-side connection portions 41*a* and 41*b* protrude rearward, whereas the power receiving-side connection portions 40*a* and 40*b* do not protrude forward, so that contact with another customer or another cart 1 is prevented, and the power transmitting-side connection portions 41*a* and 41*b* and the connection terminal 41*c* that can move due to impact during nesting are prevented from being damaged.

In addition, the connection terminals 40*c* and 41*c* are in an electrically connected state when the power transmitting-side connection portions 41*a* and 41*b* contact the power receiving-side connection portions 40*a* and 40*b* while being located at the protrusion positions, and an electrically and mechanically connected state is maintained while the power transmitting-side connection portions 41*a* and 41*b* are moving between the protrusion position and the retraction position. Thereafter, even when the front and rear carts 1 are slightly separated from each other in the front-rear direction after adjacent carts 1 are lined up to be stacked in the front-rear direction, and thus the connection terminals 40*c* and 41*c* are in a connected state, the power transmitting-side connection portions 41*a* and 41*b* are biased by the compression springs 43 and 43 to follow the power receiving-side connection portions 40*a* and 40*b*, so that the connected state of connection terminals 40*c* and 41*c* is maintained while the power transmitting-side connection portions 41*a* and 41*b* move from the retraction positions to the protrusion positions. Therefore, the electrical connected state is prevented from being easily released.

In addition, the power transmitting portion 11 has the right and left power transmitting-side connection portions 41*a* and 41*b* that separately protrude toward the rear side, and the connection terminals 41*c* and 41*c* are provided on respective rear end surfaces of the right and left power transmitting-side connection portions 41*a* and 41*b*. In this way, since the two connection terminals 41*c* and 41*c* are independently provided on the right and left power transmitting-side connection portions 41*a* and 41*b*, the power transmitting portion reliably easily contacts the power receiving portion 10 of another cart 1 during nesting.

In addition, the right and left power transmitting-side connection portions 41*a* and 41*b* are integrally formed by the power transmitting-side case 41 serving as a connection member that connects the power transmitting-side connection portions 41*a* and 41*b*, and as a result are integrally formed with the power transmitting-side case 41, and the power transmitting-side case 41 is biased rearward by the compression springs 43 and 43 provided on the right and left sides, so that the right and left power transmitting-side connection portions 41*a* and 41*b* can be stably biased toward the protrusion position side.

In addition, when the connection terminals 40*c* and 41*c* are provided to extend in the vertical direction on the power receiving-side connection portions 40*a* and 40*b* and the power transmitting-side connection portions 41*a* and 41*b*, respectively, the power transmitting portion 11 and the power receiving portion 10 of another cart 1 are easily connected even if the power transmitting portion 11 and the power receiving portion 10 are vertically misaligned, and thus it is less likely to be affected by differences in height of another cart 1 due to unevenness of the floor surface, adhesion of dust to wheels, etc.

In addition, the power receiving-side connection portions 40*a* and 40*b* and the power transmitting-side connection portions 41*a* and 41*b* are each provided in front of the placing portion 5*a* of the lower body part 2*a*, and thus can be prevented from being damaged by contact with a foot of the user, etc. operating on the rear side of the cart 1. In addition, in the lower body part 2*a*, by being provided on the front and rear surfaces of the strong base 21 that supports the frame members 31*a* and 31*b* included in the upper body part 2*b*, it is possible to prevent damage by contact with another customer or another cart 1.

In addition, when the side frames 22*a* and 22*b* serving as cart guide frames extending rearward are provided on the right and left sides of the power transmitting-side connection portions 41*a* and 41*b* in the cart body 2, the power receiving-side connection portions 40*a* and 40*b* of the cart 1 on the rear side are guided to the power transmitting-side connection portions 41*a* and 41*b* on the front side by the right and left side frames 22*a* and 22*b* of the cart 1 on the front side, and thus the connection terminals 40*c* and 41*c* are easily connected to each other.

In addition, when the bases 21 of the front and rear carts 1 contact each other, relative positions of the front and rear carts 1 in the front-rear direction are determined. Further, when the right and left side frames 22*a* and 22*b* determine relative positions of the front and rear carts 1 in the right-left direction, mutually relative movement becomes difficult. Therefore, connection between the connection terminals 40*c* and 41*c* of the power receiving-side connection portions 40*a* and 40*b* and the power transmitting-side connection portions 41*a* and 41*b* is less likely to be released.

In addition, the front wall 51 formed around the power receiving-side connection portions 40*a* and 40*b* includes the cover member 25. That is, by providing the cover member 25 as a cushioning material around the power receiving-side connection portions 40*a* and 40*b*, impact at the time of electrical connection between the connection terminals 40*c* and 41*c* of the power receiving-side connection portions 40*a* and 40*b* and the power transmitting-side connection portions 41*a* and 41*b* is relieved by the cover member 25, and thus the connection terminals 40*c* and 41*c* are prevented from being damaged.

In addition, when the upper body part 2*b* of the cart body 2 includes the two frame members 31*a* and 31*b* and the cover member 32 covering the outside of the two frame members 31*a* and 31*b*, and the battery 7 is provided between the two frame members 31*a* and 31*b*, there is no need to provide a separate storage place for holding the battery 7. Therefore, resource saving can be achieved, and an extra protruding part is not formed, so that an appearance is excellent, and personal safety is ensured.

In addition, the opening/closing portion 32*a* of the cover member 32 is removably attached to the frame members 31*a* and 31*b*, so that maintenance such as replacement of the battery 7 can be easily performed.

Even though the embodiments have been described above with reference to the drawings, the specific configuration is not limited to these embodiments, and any additions or modifications not depart from the scope of the invention are included in the invention.

For example, in the above embodiment, the description has been given on the premise that the cart is a cart 1 that can be nested in the front-rear direction and has the electronic device 6 used for commodity registration processing, payment processing, or registration processing and payment processing. However, the cart 1 does not necessarily have to include the electronic device 6, and may be, for example, a cart capable of detachably including the electronic device 6. In this case, the cart 1 preferably has a mounting member that can detachably provide the electronic device 6, a mobile terminal such as a smartphone, a tablet terminal, etc. to the cart body 2, a connection terminal for electrically connecting these terminals to the battery 7, etc. Further, in the cart body 2 of the cart 1, the battery 7 for supplying power to the electronic device 6 may be provided, the power receiving-side connection portions 40a and 40b electrically connectable to the power transmitting-side connection portions 71a and 71b of the external power supply device 70 may be provided on the front surface side, and the power transmitting-side connection portions 41a and 41b that supply power to the power receiving-side connection portions 40a and 40b of the following cart 1 nested in this cart 1 may be provided on the rear surface side of the power receiving-side connection portions 40a and 40b.

Further in the above embodiment, the magnets MGs and MGn are provided on both the power receiving-side connection portions 40a and 40b and the power transmitting-side connection portions 41a and 41b. However, one of the portions may be a magnetic body such as a metal member that can be magnetized by a magnet. In addition, even though the magnets MGs and MGn are provided on the right and left sides of the connection terminals 40c and 41c, the magnets MGs and MGn may be provided on the upper and lower sides of the connection terminals 40c and 41c, and the magnets MGs and MGn may be provided at positions different from the above-mentioned positions.

Further, the above embodiment illustrates a mode in which the magnets MGn and MGs for determining relative positions between carts are provided near the connection terminals 40c and 41c in the cart body 2. However, the invention is not limited thereto, and the magnets MGn and MGs may be provided at positions other than positions near the connection terminals 40c and 41c as long as the carts 1 are close to each other when the carts 1 are lined up in the front-rear direction.

Further, the above embodiment illustrates a mode in which, among the power receiving-side connection portions 40a and 40b as the power receiving portion 10 and the power transmitting-side connection portions 41a and 41b as the power transmitting portion 11, the power transmitting-side connection portions 41a and 41b are provided to be movable in the front-rear direction. However, the invention is not limited thereto. The power receiving-side connection portions 40a and 40b may be provided to be movable in the front-rear direction, and both the power receiving-side connection portions 40a and 40b and the power transmitting-side connection portions 41a and 41b may be provided to be movable in the front-rear direction. Alternatively, neither the power receiving-side connection portions 40a and 40b nor the power transmitting-side connection portions 41a and 41b may be provided to be movable in the front-rear direction.

Further, the above embodiment illustrates a mode in which the power receiving portion 10 includes the power receiving-side connection portions 40a and 40b each having the connection terminal 40c on the front surface, and power transmitting portion 11 including the power transmitting portion 76 for external power supply includes the power transmitting-side connection portions 41a and 41b each having the connection terminal 41c on the rear surface. However, the invention is not limited thereto. The power receiving portion 10 and the power transmitting portion 11 may include only the connection terminals 40c and 41c. In addition, each of the power receiving-side connection portions 40a and 40b and each of the power transmitting-side connection portions 41a and 41b may have the connection terminals 40c and 41c, which may be configured as a female connector and a male connector that can be fit to each other.

Further, the above embodiment illustrates a mode in which, when the connection terminals 40c, 41c, and 71c contact one another, power is supplied from the power transmitting portion 76 for external power supply and the power transmitting portion 11 to the power receiving portion 10. However, the invention is not limited thereto. Power may be supplied from the power transmitting portion to the power receiving portion without contact.

Further, the above embodiment illustrates a mode in which, when the connection terminals 40c and 41c contact each other, power supply from the power transmitting portion 76 for external power supply and the power transmitting portion 11 to the power receiving portion 10 starts. However, the invention is not limited thereto. It is preferable that power supply from the power transmitting portion 76 for external power supply and the power transmitting portion 11 to the power receiving portion 10 is started based on establishment of a predetermined connection condition. In this way, power supply from the power transmitting portion 76 for external power supply and the power transmitting portion 11 to the power receiving portion 10 is started after the predetermined connection condition is established, and thus electric shock, etc. is unlikely to occur and safety is ensured.

Specifically, for example, a limit switch (not illustrated) capable of detecting that the power transmitting-side connection portions 41a and 41b have retracted to the retraction positions, and an electromagnetic relay connected between the connection terminal 40c and the connection terminal 41c, etc. may be provided, and upon detecting that the power transmitting-side connection portions 41a and 41b are located at the retraction positions, the power transmitting portion 11 may be electrically connected to the power receiving portion 10 by an operation of the electromagnetic relay, and power supply from the power transmitting portion 76 for external power supply or the power transmitting portion 11 to the power receiving portion 10 may be started. In this way, it is possible to avoid occurrence of a defect by power being supplied while connection between the power transmitting portion 76 for external power supply or the power transmitting portion 11 and the power receiving portion 10 is unstable.

Note that the "predetermined connection condition" includes not only detecting that the power transmitting-side connection portions 41a and 41b are located at the retraction positions as described above, but also other connection conditions such as a connection condition that the connection terminals 40c and 41c are connected to each other, and a connection condition that a connected state between the connection terminals 40c and 41c continues for a predetermined time (for example, 10 seconds) or more. In addition, power supply may be started based on establishment of at least one connection condition among a plurality of connection conditions.

Further, the above embodiment illustrates a mode in which the cart body 2 of the cart 1 includes the lower body part 2a having a substantially bifurcated shape in a plan view and the plate-shaped upper body part 2b erected upward from the front portion of the lower body part 2a. However, the invention is not limited thereto, and the shape of the cart body 2 is not limited to the one described above, and various shapes may be adopted.

Further, the above embodiment illustrates a mode in which the power receiving-side connection portions 40a and 40b as power receiving portions and the power transmitting-side connection portions 41a and 41b as power transmitting portions are provided at a front portion of the lower body part 2a of the cart body 2. However, the invention is not limited thereto, and the power receiving-side connection portions 40a and 40b and the power transmitting-side connection portions 41a and 41b may be provided at other locations of the lower body part 2a, in the upper body part 2b, etc.

Note that the power receiving portion may be provided not only on the front wall 51 but also, for example, on each of outer surfaces of the side frames 22a and 22b, etc. to be directed obliquely forward. In addition, the power transmitting portion may be provided not only on the rear wall 53 but also, for example, on each of inner surfaces of the side frames 22a and 22b, etc. to be directed obliquely rearward.

What is claimed is:

1. A shopping cart configured to be nested in a front-rear direction, comprising:
   a cart body;
   a battery configured to supply power to an electronic device attached to the cart body for displaying commodity information read by a reading device;
   a power receiving portion provided on a front side of the cart body and electrically connectable to an external power supply; and
   a power transmitting portion provided on a rear surface side of the power receiving portion and configured to supply power to a power receiving portion of another shopping cart nested in the shopping cart, wherein
   each of the power receiving portion and the power transmitting portion is provided with a magnet for holding a relative position, and
   the power transmitting portion is movable between a retraction position and a protrusion position and is biased toward a side of the protrusion position by a biasing device.

2. The shopping cart according to claim 1,
   wherein the power transmitting portion has right and left connection portions separately protruding rearward, and
   a wiring connection terminal is provided on a tip surface of each of the right and left connection portions.

3. The shopping cart according to claim 2,
   wherein the right and left connection portions are integrally formed by a connection member coupling the right and left connection portions, and
   the connection member is biased rearward by right and left biasing members constituting the biasing device.

4. The shopping cart according to claim 3,
   wherein power supply from the power transmitting portion to the power receiving portion is started based on establishment of a predetermined connection condition.

5. The shopping cart according to claim 2,
   wherein power supply from the power transmitting portion to the power receiving portion is started based on establishment of a predetermined connection condition.

6. The shopping cart according to claim 1,
   wherein a wiring connection terminal extends in a vertical direction on each of the power receiving portion and the power transmitting portion.

7. The shopping cart according to claim 6,
   wherein power supply from the power transmitting portion to the power receiving portion is started based on establishment of a predetermined connection condition.

8. The shopping cart according to claim 1,
   wherein power supply from the power transmitting portion to the power receiving portion is started based on establishment of a predetermined connection condition.

9. A shopping cart configured to be nested in a front-rear direction, comprising:
   a cart body;
   a battery configured to supply power to an electronic device attached to the cart body for displaying commodity information read by a reading device;
   a power receiving portion provided on a front side of the cart body and electrically connectable to an external power supply; and
   a power transmitting portion provided on a rear surface side of the power receiving portion and configured to supply power to a power receiving portion of another shopping cart nested in the shopping cart, wherein
   each of the power receiving portion and the power transmitting portion is provided with a magnet configured for holding a relative position, and
   a wiring connection terminal extends in a vertical direction on each of the power receiving portion and the power transmitting portion.

* * * * *